US011716325B2

(12) United States Patent
Smolny et al.

(10) Patent No.: US 11,716,325 B2
(45) Date of Patent: Aug. 1, 2023

(54) LIMITING SCOPES IN TOKEN-BASED AUTHORIZATION SYSTEMS

(71) Applicant: International Business Machines Corporation, Armonk, NY (US)

(72) Inventors: Martin Smolny, Boeblingen (DE); Thomas Dürr, Magstadt (DE); Michael Beck, Bad Teinach-Zavelstein (DE)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 17/152,963

(22) Filed: Jan. 20, 2021

(65) Prior Publication Data

US 2022/0232003 A1 Jul. 21, 2022

(51) Int. Cl.
*H04L 9/40* (2022.01)
*G06F 9/54* (2006.01)

(52) U.S. Cl.
CPC .......... *H04L 63/0853* (2013.01); *G06F 9/54* (2013.01); *H04L 63/10* (2013.01); *H04L 63/20* (2013.01)

(58) Field of Classification Search
CPC ..... H04L 63/0853; H04L 63/10; H04L 63/20; G06F 9/54
See application file for complete search history.

(56) References Cited

U.S. PATENT DOCUMENTS

| | | | | |
|---|---|---|---|---|
| 9,397,990 | B1 * | 7/2016 | Taly | H04L 63/0807 |
| 10,104,084 | B2 * | 10/2018 | Biggs | H04L 63/0815 |
| 10,223,541 | B2 * | 3/2019 | Balijepalli | H04L 63/0807 |
| 10,749,679 | B2 | 8/2020 | Galloway | |
| 2013/0198509 | A1 | 8/2013 | Buruganahalli et al. | |
| 2014/0020064 | A1 * | 1/2014 | Hildebrand | G06F 21/335 726/4 |
| 2015/0229628 | A1 | 8/2015 | Kosim-Satyaputra et al. | |
| 2017/0034172 | A1 | 2/2017 | Biggs et al. | |
| 2018/0060595 | A1 * | 3/2018 | Olds | G06F 3/1238 |
| 2019/0364035 | A1 * | 11/2019 | Smolny | H04L 63/108 |
| 2020/0067903 | A1 | 2/2020 | Yegorin | |

OTHER PUBLICATIONS

PCT International Search Report and Written Opinion, dated Apr. 20, 2022, regarding Application No. PCT/EP2022/050344, 13 pages.
Safwen: "oauth 2.0—How to reduce the size of the access/refresh tokens in Keycloak?—Stack Overflow", stackoverflow, May 2, 2019 (May 2, 2019), XP055909781, Retrieved from the Internet: URL:https://stackoverflow.com/questions/55955926/how-to-reduce-the-size-of-the-access-refresh-tokens-in-keycloak [retrieved on Apr. 6, 2022].

(Continued)

*Primary Examiner* — Michael R Vaughan
(74) *Attorney, Agent, or Firm* — Yee & Associates, P.C.

(57) ABSTRACT

Access token scope limiting is provided. An access token of a client containing a list of scopes is presented to an authorization application programming interface of the computer. Each scope in the list of scopes defines a permission to access a particular protected resource hosted by a resource server. A new access token is returned to the client containing a decreased number of scopes using a scope alias in response to the authorization application programming interface requesting a decrease in a number of scopes in the list of scopes. The scope alias representing a plurality of specific scopes from the list of scopes contained in the presented access token.

25 Claims, 13 Drawing Sheets

(56) References Cited

OTHER PUBLICATIONS

"Overview—UAA API Reference," CloudFoundry, accessed Oct. 30, 2020, 195 pages. https://docs.cloudfoundry.org/api/uaa/version/74.27.0/index.html#overview.

"Persist additional claims and tokens from external providers in ASP.NET Core," Microsoft, Oct. 15, 2019, accessed Oct. 30, 2020, 12 pages. https://docs.microsoft.com/en-us/aspnet/core/security/authentication/social/additional-claims?view=aspnetcore-3.1.

"Scope aliases," Dagger, accessed Oct. 30, 2020, 4 pages. https://dagger.dev/hilt/scope-aliases.html.

"Using OAuth 2.0 to Access Google APIs," Google Identity, accessed Oct. 30, 2020, 10 pages. https://developers.google.com/identity/protocols/oauth2.

"Working with Authentication," Vimeo, Inc., accessed Oct. 30, 2020, 17 pages. https://developer.vimeo.com/api/authentication.

"Scope character limit hit when generating OAuth tokens," Stack Overflow, Stack Exchange Inc,. Accessed Jan. 19, 2021, 2 pages. https://stackoverflow.com/questions/42718245/scope-character-limit-hit-when-generating-oauth-tokens.

JWT max size limit(2kb), Issue No. 3025, GitHub, Inc., accessed Jan. 19, 2021, 3 pages. https://github.com/IdentityServer/IdentityServer4/issues/3025.

"Limit for number of scopes per API," OAuth0 Community, accessed Jan. 19, 2021, 2 pages. https://community.auth0.com/t/limit-for-number-of-scopes-per-api/20387/4.

Bertocci, "On The Nature of OAuth2's Scopes," Auth0® Inc., Sep. 5, 2018, accessed Jan. 19, 2021, 10 pages. https://auth0.com/blog/on-the-nature-of-oauth2-scopes/.

Baier, "Identity vs Permissions," leastprivilege.com, Dec. 16, 2016, accessed Jan. 19, 2021, 12 pages. https://leastprivilege.com/2016/12/16/identity-vs-permissions/.

Mell et al., "The NIST Definition of Cloud Computing," Computer Security Division, National Institute of Standards and Technology, Jan. 2011, 7 pages.

* cited by examiner

LIMITING SCOPES IN TOKEN-BASED AUTHORIZATION SYSTEMS

BACKGROUND

1. Field

The disclosure relates generally to access management and more specifically to limiting a number of scopes in access token-based authorization systems while maintaining a same level of access permissions for access tokens.

2. Description of the Related Art

Identity and access management (IAM) is a framework of processes, policies, and technologies that facilitates the management of digital identities. An IAM framework can control user access to protected resources (e.g., data, documents, files, software, hardware, services, and the like) corresponding to an entity, such as, for example, an enterprise, business, company, organization, institution, agency, or the like. IAM systems can be deployed on premises, provided by a third-party vendor through a cloud-based subscription model, or deployed in a hybrid model. Typical systems used for IAM include single sign-on systems, two-factor authentication, multifactor authentication, privileged access management, and token-based authorization.

Token-based authentication (e.g., OAuth 2.0) is a protocol which allows end users and services to verify their identity and in return receive a unique access token. During the lifetime of an access token (i.e., a defined period of time), end users and services can access a protected resource, such as a cloud service, which the access token has been issued for. First, an end user or service requests access to the protected resource. That may involve a login with credentials, such as username and password. The authorization server determines whether the end user or service should have access by, for example, comparing the received credentials with stored credentials corresponding to the end user or service. After credential authentication or verification, the authorization server issues the access token and refresh token to the end user or service. The authorization server signs the access token using either a private secret or a public/private key.

Before a particular client web application of the end user or service can access a particular protected resource using an application programming interface, the client web application must obtain the access token that grants access to that particular application programming interface. The access token contains an end user or service identifier for the network session and identifies protected resource access privileges using scopes. A scope is a space-separated list of resource access permissions that the client web application is given permission to access. In other words, a scope determines the type of access that the access token does and does not permit. For example, if the client web application tries to make an application programming interface request for a protected resource with an access token that does not have the right scope (i.e., correct permission), then the application programming interface will deny the protected resource access request. After the client web application obtains the access token, the client web application sends the access token to the application programming interface corresponding to the protected resource. The access token is valid only for the set of operations and the protected resource described in the scopes field of the access token. For example, if the access token is issued for a calendar application programming interface, then the access token only permits access to the calendar application programming interface and does not permit access to a contacts application programming interface, for example, or any other type of application programming interface.

There is no limit to the number of scopes that can be added to an application programming interface definition of an authorization server. For example, an entity can have hundreds or thousands of scopes for accessing its protected resources. However, the number of scopes that can be included in an access token may be bound by the size of the access token when used in an authorization header (e.g., HTTP protocol). Further, most authorization servers enforce an access token size limit (e.g., 8-20 KB). As a result, access tokens with large scopes fields can be rejected by authentication servers. Furthermore, large access tokens can increase network latency and decrease system performance.

SUMMARY

According to one illustrative embodiment, a computer-implemented method for access token scope limiting is provided. A computer presents an access token of a client containing a list of scopes to an authorization application programming interface of the computer. Each scope in the list of scopes defines a permission to access a particular protected resource hosted by a resource server. The computer returns a new access token to the client containing a decreased number of scopes using a scope alias in response to the authorization application programming interface requesting a decrease in a number of scopes in the list of scopes. The scope alias representing a plurality of specific scopes from the list of scopes contained in the presented access token. According to other illustrative embodiments, a computer system and computer program product for access token scope limiting are provided.

In addition, the illustrative embodiments also receive an access token request with an authorization code and a client identifier from the client via a network, determine whether scopes are specified in the access token request based on an analysis of the access token request, identify a set of scopes specified in the access token request to form a set of specified scopes in response to determining that scopes are specified in the access token request based on the analysis, expand each scope alias included in the set of specified scopes to form an expanded set of specified scopes, expand all scope aliases included in authorized scopes corresponding to the client identifier retrieved from storage to form an expanded set of authorized scopes, generate an intersection between the expanded set of specified scopes and the expanded set of authorized scopes, identify a number of valid scopes corresponding to the access token request by the client based on the intersection between the expanded set of specified scopes and the expanded set of authorized scopes, decrease the number of valid scopes corresponding to the access token request using a number of predefined scope aliases where each of the number of predefined scope aliases represents a collection of two or more client-specified individual scopes, and generate the access token for the client using the number of predefined scope aliases and any remaining valid scopes corresponding to the access token request not included in at least one of the number of predefined scope aliases.

Further, the illustrative embodiments receive a refresh token containing a list of scopes corresponding to an existing access token of the client along with a request for a new access token specifying a limited set of scopes from the client via a network where the limited set of scopes is specific to a particular set of protected resources that the client wants to access, expand each scope alias included in the list of scopes of the refresh token to form an expanded set of refresh token scopes, expand each scope alias included in the limited set of scopes specified in the request for the new access token to form an expanded set of specified scopes, generate an intersection between the expanded set of refresh token scopes and the expanded set of specified scopes, identify a number of valid scopes corresponding to the request for the new access token based on the intersection between the expanded set of refresh token scopes and the expanded set of specified scopes, decrease the number of valid scopes corresponding to the request for the new access token using one or more predefined scope aliases where each of the one or more predefined scope aliases represents a collection of two or more client-specified individual scopes, and generate the new access token for the client using the one or more predefined scope aliases and any remaining valid scopes corresponding to the request for the new access token that were not included in the one or more predefined scope aliases.

As a result, the illustrative embodiments provide a technical effect and practical application in the field of protected resource access management by decreasing a size of scopes fields in access tokens using a scope alias to represent a plurality of scopes while maintaining a same level of protected resource access permissions for the access tokens as the plurality of individual scopes that the scope alias represents. The reduced size of access tokens generated by the illustrative embodiments increases network response times, which enables faster protected resource access and increased system performance.

DETAILED DESCRIPTION

Figure 1:
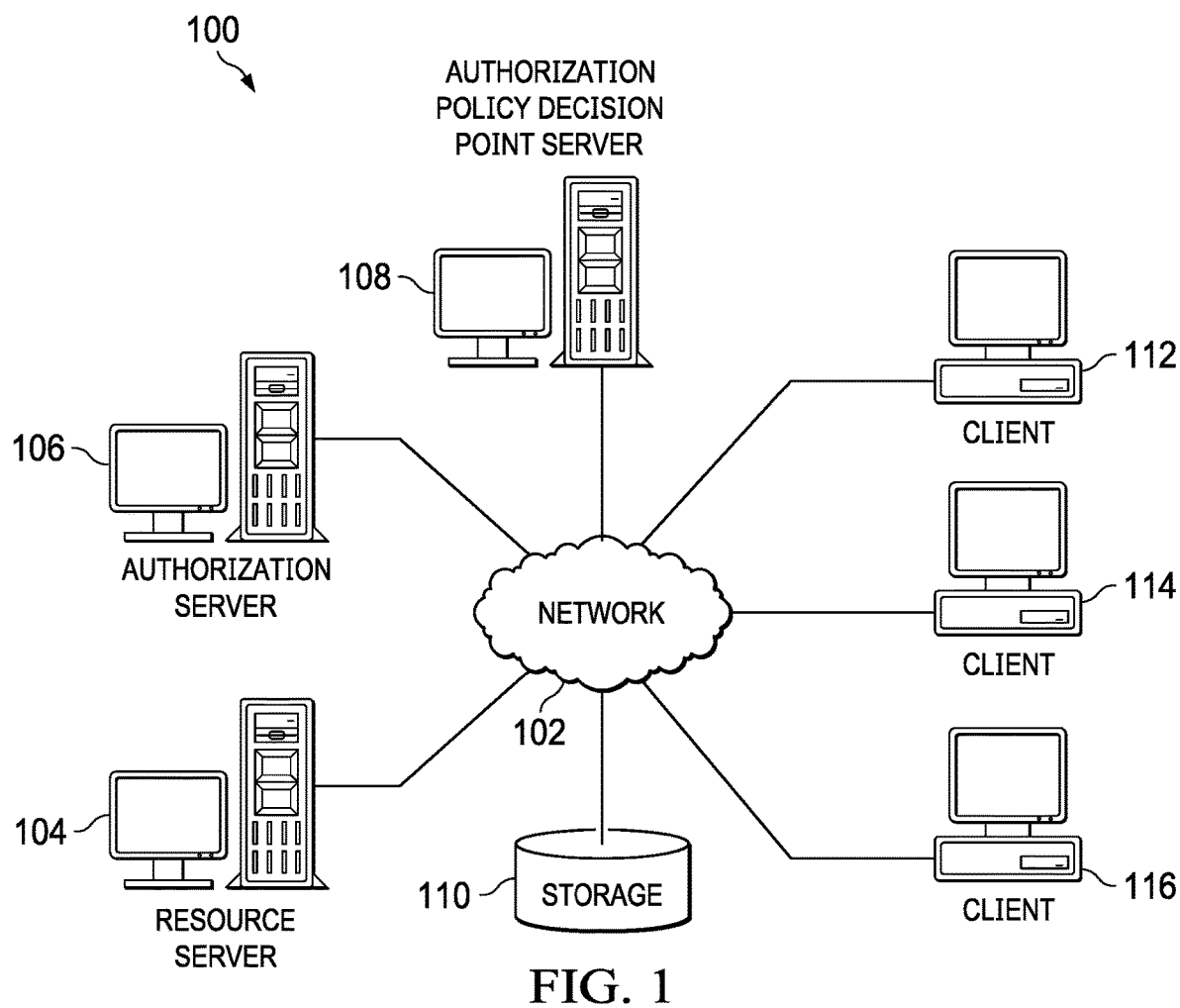
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-4 and 7-9, diagrams of data processing environments are provided in which illustrative embodiments may be implemented. It should be appreciated that FIGS. 1-4 and 7-9 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, resource server 104, authorization server 106, and authorization policy decision point server 108 connect to network 102, along with storage 110. Resource server 104, authorization server 106, and authorization policy decision point server 108 may be, for example, server computers with high-speed connections to network 102. Also, it should be noted that resource server 104, authorization server 106, and authorization policy decision point server 108 may each represent multiple computing nodes in one or more cloud environments managed by one or more entities. Alternatively, resource server 104, authorization server 106, and authorization policy decision point server 108 may each represent one or more clusters of servers in one or more data centers.

Resource server 104 hosts a set of protected resources. The set of protected resources may include, for example, one or more of data, documents, files, software, hardware, services, and the like. Resource server 104 is capable of accepting and responding to protected resource access requests from client devices using access tokens. Access tokens contain end user or service identifiers for network sessions and identify protected resource access privileges using scopes. Scopes are space-separated lists of permissions for accessing specific protected resources. A resource owner is an entity capable of granting access to a protected resource. When the resource owner is a person, that person is referred to as an end user.

Authorization server 106 issues the access tokens to the client devices after successfully authenticating resource owners corresponding to the client devices. Furthermore, authorization server 106 limits the number of scopes in an access token by utilizing a set of scope aliases, each scope alias representing a plurality of individual scopes. A scope alias maintains the same level of access permissions for the access token as the plurality of individual scopes that the scope alias represents.

Authorization policy decision point server 108 stores all authorization policies. To support resource server 104 in protecting hosted resources, authorization policy decision point server 108 includes an authorization application programming interface to evaluate authorization policies corresponding to each protected resource hosted by resource server 104 and provide an authorization decision. It should be noted that even though authorization policy decision point server 108 is shown as a separate server computer in this example, in an alternative illustrative embodiment authorization policy decision point server 108 can be included in, or combined with, authorization server 106.

Client 112, client 114, and client 116 also connect to network 102. Clients 112, 114, and 116 are clients of resource server 104. In this example, clients 112, 114, and 116 are shown as desktop or personal computers with wire communication links to network 102. However, it should be noted that clients 112, 114, and 116 are examples only and may represent other types of data processing systems, such as, for example, network computers, laptop computers, handheld computers, smart phones, smart watches, smart televisions, smart vehicles, smart glasses, smart appliances, gaming devices, kiosks, and the like, with wire or wireless communication links to network 102. Users of clients 112, 114, and 116 may utilize specific web applications loaded on clients 112, 114, and 116 to access corresponding protected resources hosted by resource server 104 using access tokens with appropriate scopes received from authorization server 106.

Storage 110 is a network storage device capable of storing any type of data in a structured format or an unstructured format. In addition, storage 110 may represent a plurality of network storage devices. Further, storage 110 may store identifiers and network addresses for a plurality of resource servers, identifiers and network addresses for a plurality of different client devices, identifiers for a plurality of different users, and the like. Furthermore, storage 110 may store other types of data, such as authentication or credential data that may include usernames, passwords, and biometric data associated with the different users, for example.

In addition, it should be noted that network data processing system 100 may include any number of additional servers, clients, storage devices, and other devices not shown. Program code located in network data processing system 100 may be stored on a computer readable storage medium or a set of computer readable storage media and downloaded to a computer or other data processing device for use. For example, program code may be stored on a computer readable storage medium on resource server 104 and downloaded to client 112 over network 102 for use on client 112.

In the depicted example, network data processing system 100 may be implemented as a number of different types of communication networks, such as, for example, an internet, an intranet, a wide area network (WAN), a local area network (LAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 2:
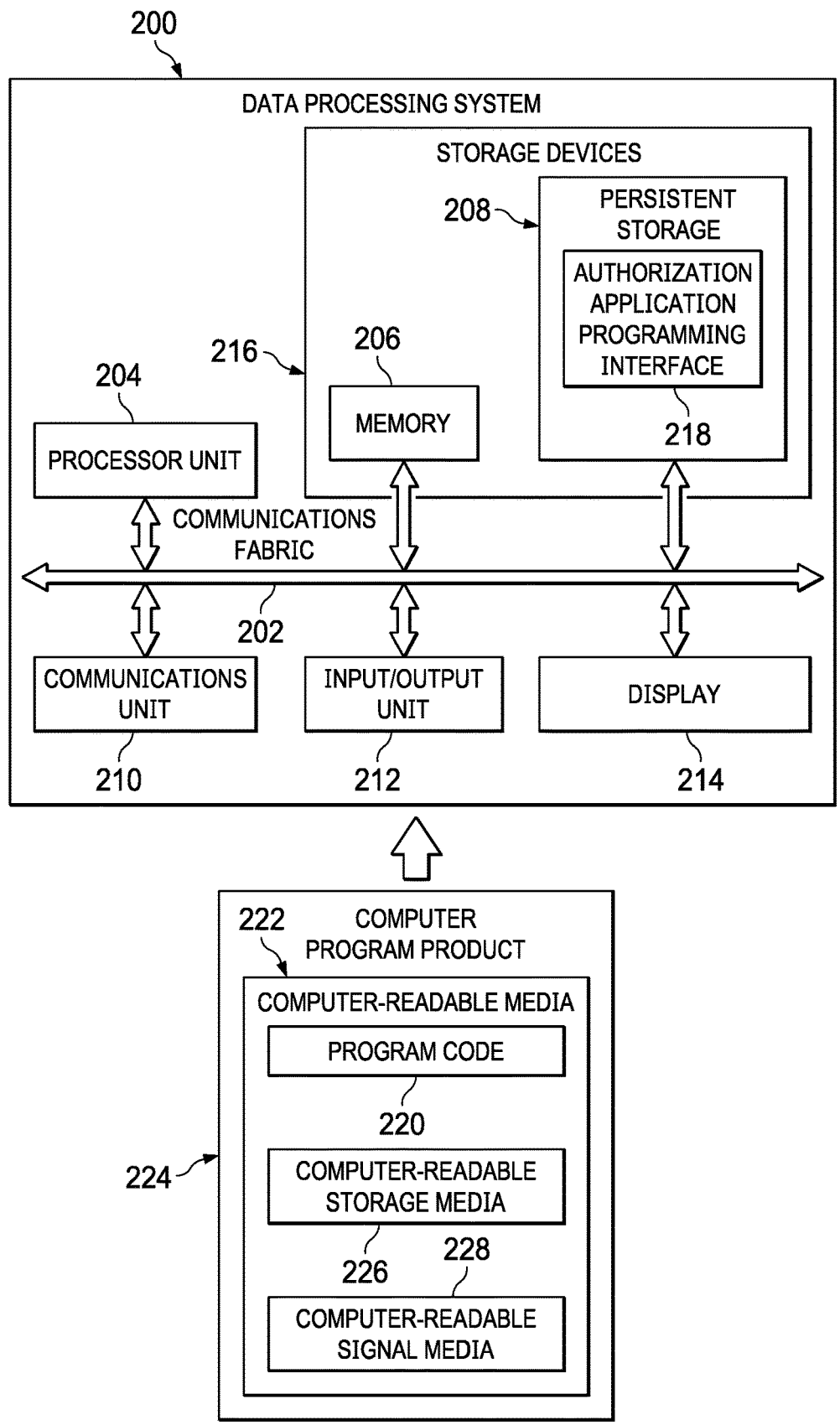
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as authorization server 106 or authorization policy decision point server 108 in FIG. 1, in which computer readable program code or instructions implementing the access management processes of illustrative embodiments may be located. In this example, data processing system 200 includes communications fabric 202, which provides communications between processor unit 204, memory 206, persistent storage 208, communications unit 210, input/output unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer readable storage device or a computer readable storage medium is any piece of hardware that is capable of storing information, such as, for example, without limitation, data, computer readable program code in functional form, and/or other suitable information either on a transient basis or a persistent basis. Further, a computer readable storage device or a computer readable storage medium excludes a propagation medium, such as transitory signals. Furthermore, a computer readable storage device or a computer readable storage medium may represent a set of computer readable storage devices or a set of computer readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores authorization application programming interface 218. Authorization application programming interface 218 is an application programming interface for authorizing access to one or more protected resources hosted by a resource server, such as, for example, resource server 104 in FIG. 1. In addition, it should be noted that authorization application programming interface 218 may represent a plurality of different authorization application programming interfaces. Further, authorization application programming interface 218 may be located in a plurality of data processing systems.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 21 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 220 is located in a functional form on computer readable media 222 that is selectively removable and may be loaded onto or transferred to data processing system 200 for running by processor unit 204. Program code 220 and computer readable media 222 form computer program product 224. In one example, computer readable media 222 may be computer readable storage media 226 or computer readable signal media 228.

In these illustrative examples, computer readable storage media 226 is a physical or tangible storage device used to store program code 220 rather than a medium that propagates or transmits program code 220. Computer readable storage media 226 may include, for example, an optical or magnetic disc that is inserted or placed into a drive or other device that is part of persistent storage 208 for transfer onto a storage device, such as a hard drive, that is part of persistent storage 208. Computer readable storage media 226 also may take the form of a persistent storage, such as a hard drive, a thumb drive, or a flash memory that is connected to data processing system 200.

Alternatively, program code 220 may be transferred to data processing system 200 using computer readable signal media 228. Computer readable signal media 228 may be, for example, a propagated data signal containing program code 220. For example, computer readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer readable media 222" can be singular or plural. For example, program code 220 can be located in computer readable media 222 in the form of a single storage device or system. In another example, program code 220 can be located in computer readable media 222 that is distributed in multiple data processing systems. In other words, some instructions in program code 220 can be located in one data processing system while other instructions in program code 220 can be located in one or more other data processing systems. For example, a portion of program code 220 can be located in computer readable media 222 in a server computer while another portion of program code 220 can be located in computer readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
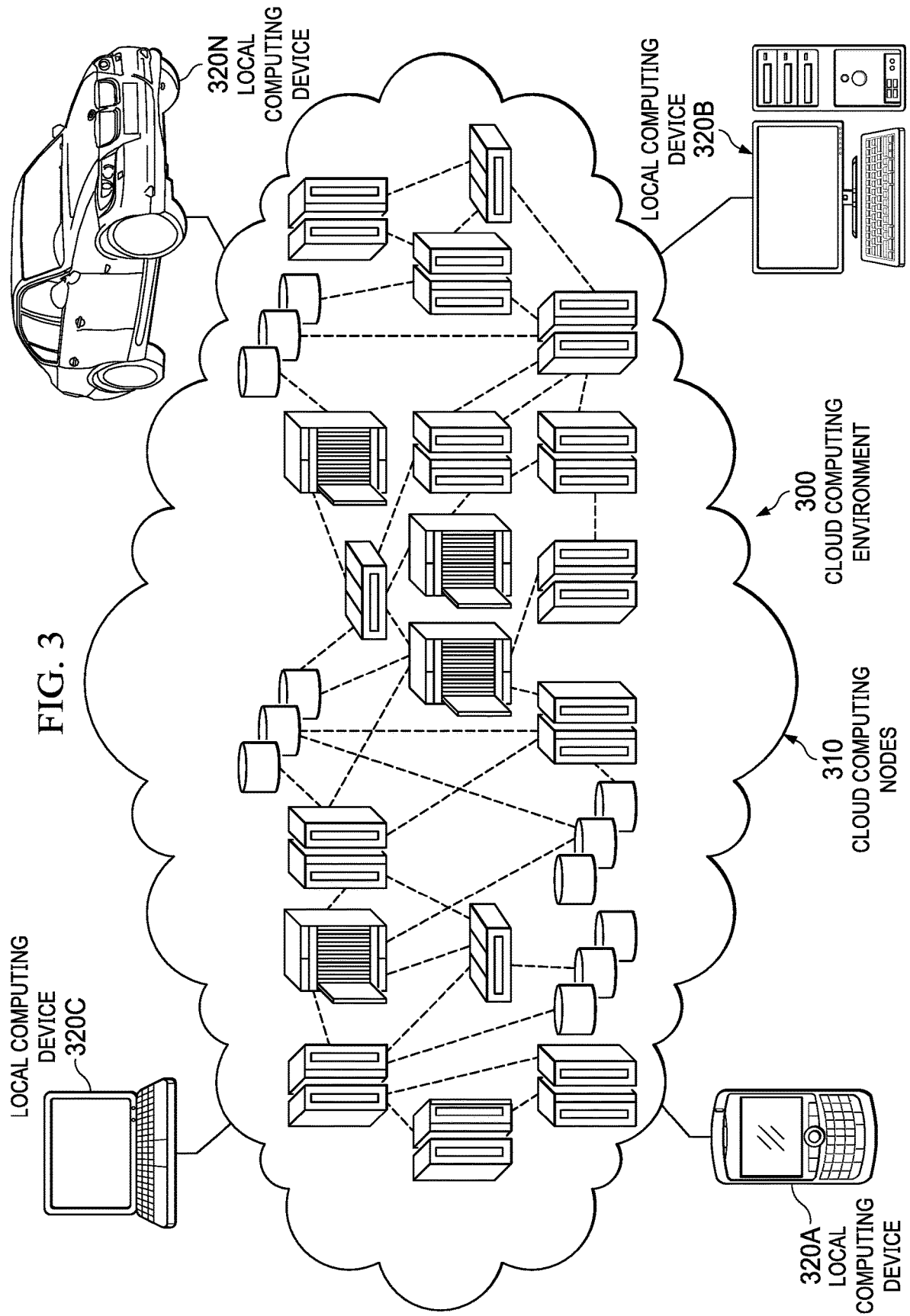
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or smart phone 320A, desktop computer 320B, laptop computer 320C, and/or vehicle computer system 320N, may communicate. Cloud computing nodes 310 may be, for example, resource server 104, authorization server 106, and authorization policy decision point server 108 in FIG. 1. Local computing devices 320A-320N may be, for example, clients 112-116 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
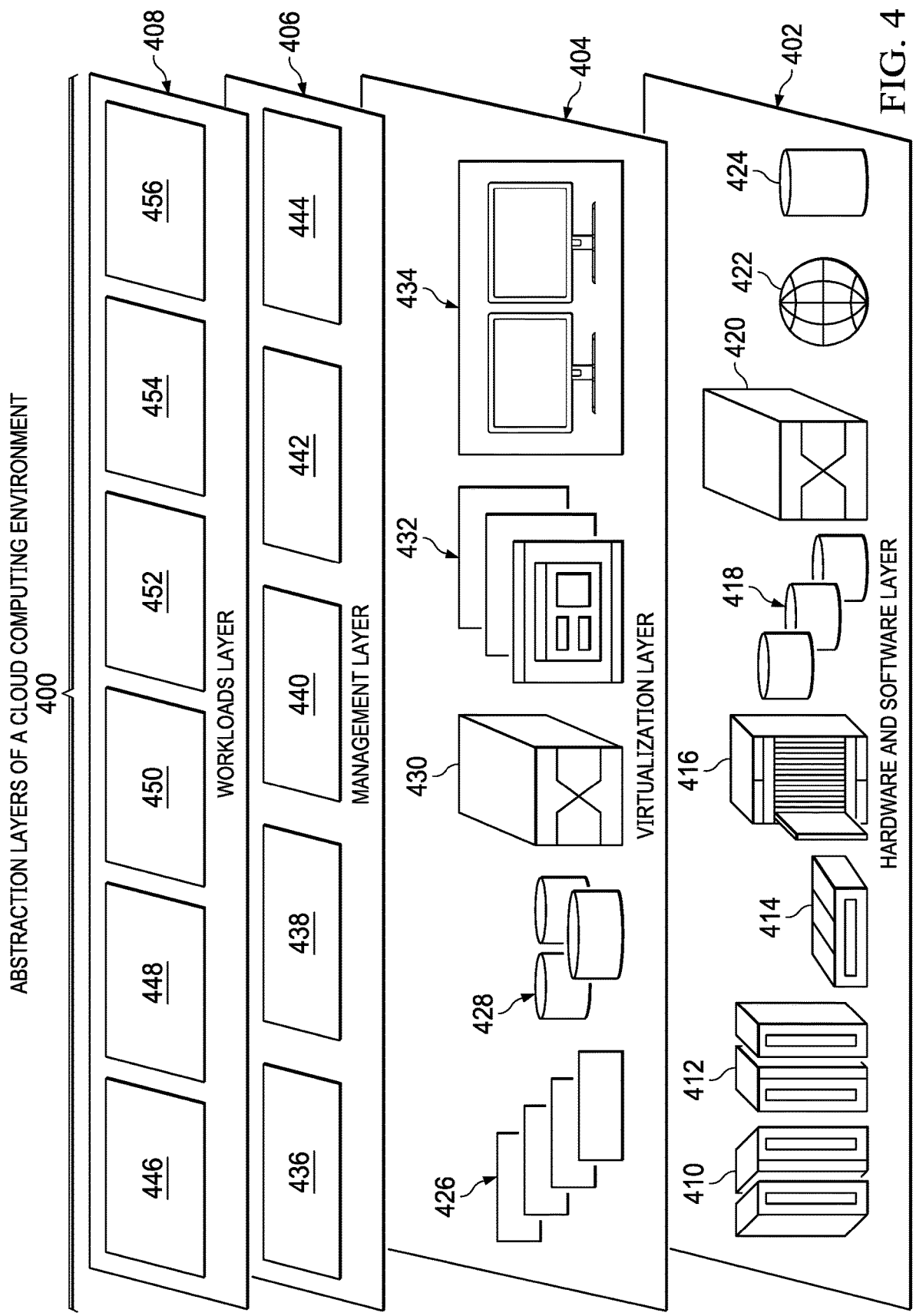
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and protected resource access management 456.

Token-based authorization systems (e.g., OAuth 2.0) define authorization using scopes (i.e., an arbitrary string of characters or keywords). A scope defines access permission to a set of protected resources. Scopes are usually not standardized; each authorization system defines its own set of scopes. A typical set of scopes may be, for example, uaa.read, uaa.write, uaa.admin, cloud_controller.read, cloud_controller.write, and cloud_controller.admin. The list of scopes gets longer the more authorizations that correspond to an end user or service. With the increasing size of the list of scopes, access tokens also get larger and larger making invocations (e.g., protected resource access requests) via networks slower due to increased latency. For example, each character used for a scope results in 1.33 characters in an access token. For example, the scope cloud_controller.admin uaa.scim clients.read includes 44 characters, which results in approximately 59 characters in the access token. An authorization server may implement token scope character limits (i.e., a character length limit on the scopes field can be assigned against generated access tokens). For example, an authorization server can return invalid_scope when the size of an access token's scopes field is greater than or equal to the set maximum size threshold limit (e.g., 20 KB). In other words, too many scopes included in an access token can result in an error being thrown.

Illustrative embodiments utilize scopes in a very limited way (i.e., the authorization server is implemented with a separate set of application programming interfaces). Scopes are a high-level authorization filter (i.e., for each available protected resource (e.g., service) in the cloud, there is one scope that limits the permission of an access token to one specific protected resource only). Typically, an end user that logs in via a graphical user interface or command line interface receives an access token that has the authorization to access all protected resources (e.g., services) of an entity, such as, for example, an enterprise, company, business, organization, institution, agency, or the like. An entity can have hundreds or thousands of scopes for different protected resources. As a result, each access token can contain the full list of protected resource scopes making these access tokens very large (e.g., >20 KB), which decreases system performance by increasing network latency and increases access token rejection rates (i.e., errors being thrown) by authentication servers. Illustrative embodiments utilize scope aliases to decrease the size of access tokens (i.e., scopes fields), which increases system performance by decreasing network response times (i.e., decreased time to access protected resources) and decreases access token rejection rates by authentication servers, while maintaining the same level of access permissions for the access tokens. As used herein, one scope alias represents a plurality of individual scopes.

Thus, illustrative embodiments provide one or more technical solutions that overcome a technical problem with access tokens with large scopes fields (e.g., 2 KB or greater in size), which cause decreased network response times, decreased system performance, and increased rejection rates of protected resource access requests (e.g., errors) by network switches, routers, servers, and the like. As a result, these one or more technical solutions provide a technical effect and practical application in the field of protected resource access management by decreasing a size of scopes fields in access tokens using a scope alias to represent a plurality of scopes while maintaining a same level of protected resource access permissions for the access tokens as the plurality of individual scopes that the scope alias represents. The reduced size of access tokens generated by illustrative embodiments improves/decreases network response times, which enables faster protected resource access and increased system performance.

Figure 5:
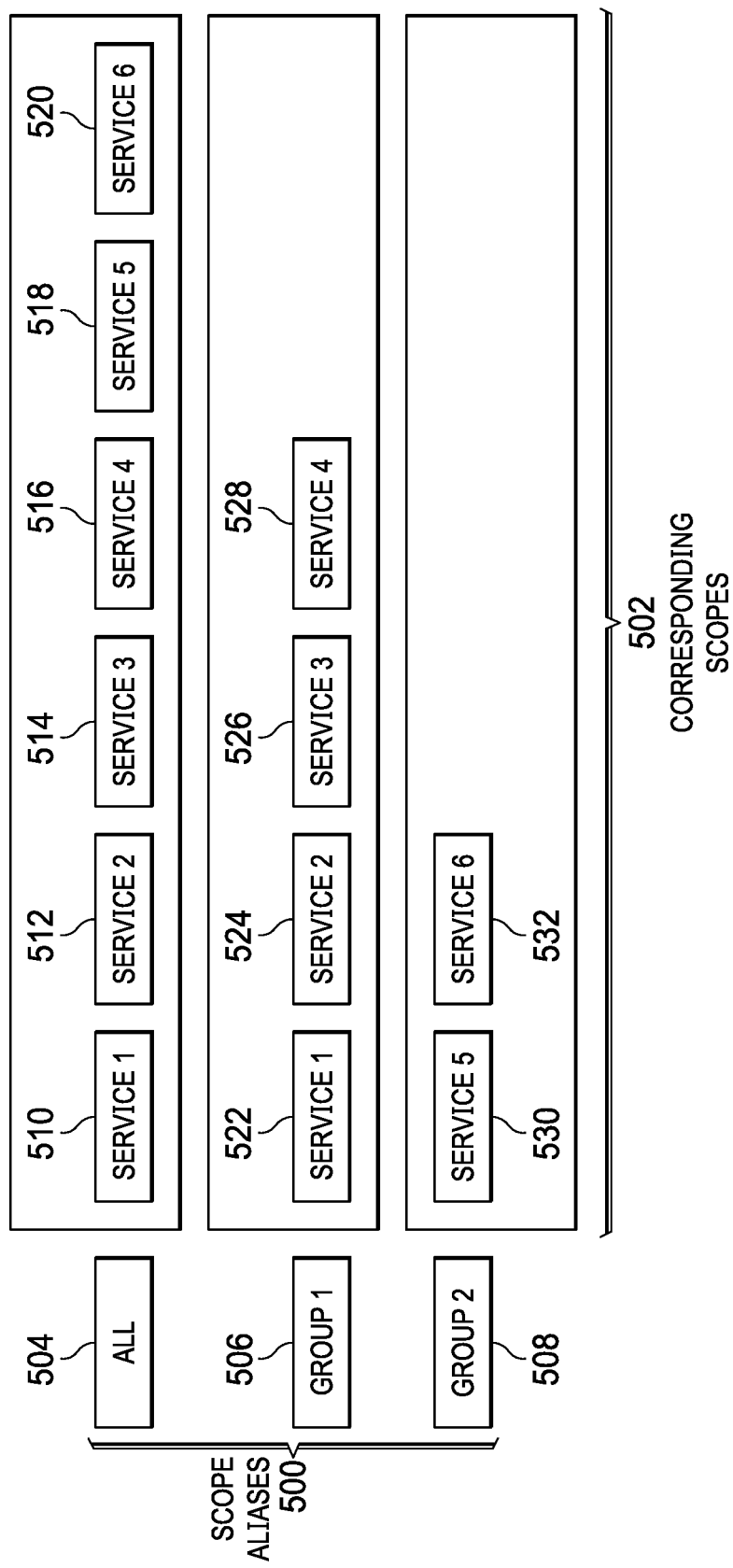
FIG. 5 is a diagram illustrating an example of scope aliases in accordance with an illustrative embodiment.

With reference now to FIG. 5, a diagram illustrating an example of scope aliases is depicted in accordance with an illustrative embodiment. Scope aliases 500 are a set of scope aliases, each scope alias in the set represents a plurality or collection of specific individual scopes. For example, scope aliases 500 represent corresponding scopes 502.

In this example, scope aliases 500 include scope alias "ALL" 504, scope alias "GROUP1" 506, and scope alias "GROUP2" 508. Scope alias "ALL" 504 represents the individual scopes of "SERVICE1" 510, "SERVICE2" 512, "SERVICE3" 514, "SERVICE4" 516, "SERVICE5" 518, and "SERVICE6" 520. Scope alias "GROUP1" 506 represents the individual scopes of "SERVICE1" 522, "SERVICE2" 524, "SERVICE3" 526, and "SERVICE4" 528. Scope alias "GROUP2" 508 represents the individual scopes of "SERVICE5" 530 and "SERVICE6" 532. It should be noted that each of the listed services above is a protected resource hosted by a resource server, such as, for example, resource server 104 in FIG. 1.

When an authorization server, such as, for example, authorization server 106 in FIG. 1, places scope alias "ALL" 504 in a scopes field of a generated access token, that particular access token has the same level of access permissions as all of the individual scopes "SERVICE1" 510, "SERVICE2" 512, "SERVICE3" 514, "SERVICE4" 516, "SERVICE5" 518, and "SERVICE6" 520, while decreasing the size of the scopes field. Similarly, when the authorization places scope alias "GROUP1" 506 in a scopes field of a generated access token, that particular access token has the same level of access permissions as individual scopes "SERVICE1" 522, "SERVICE2" 524, "SERVICE3" 526, and "SERVICE4" 528, while limiting the size of the scopes field. Also, when the authorization places scope alias "GROUP2" 508 in a scopes field of a generated access token, that particular access token has the same level of access permissions as individual scopes "SERVICE5" 530 and "SERVICE6" 532.

Figure 6:
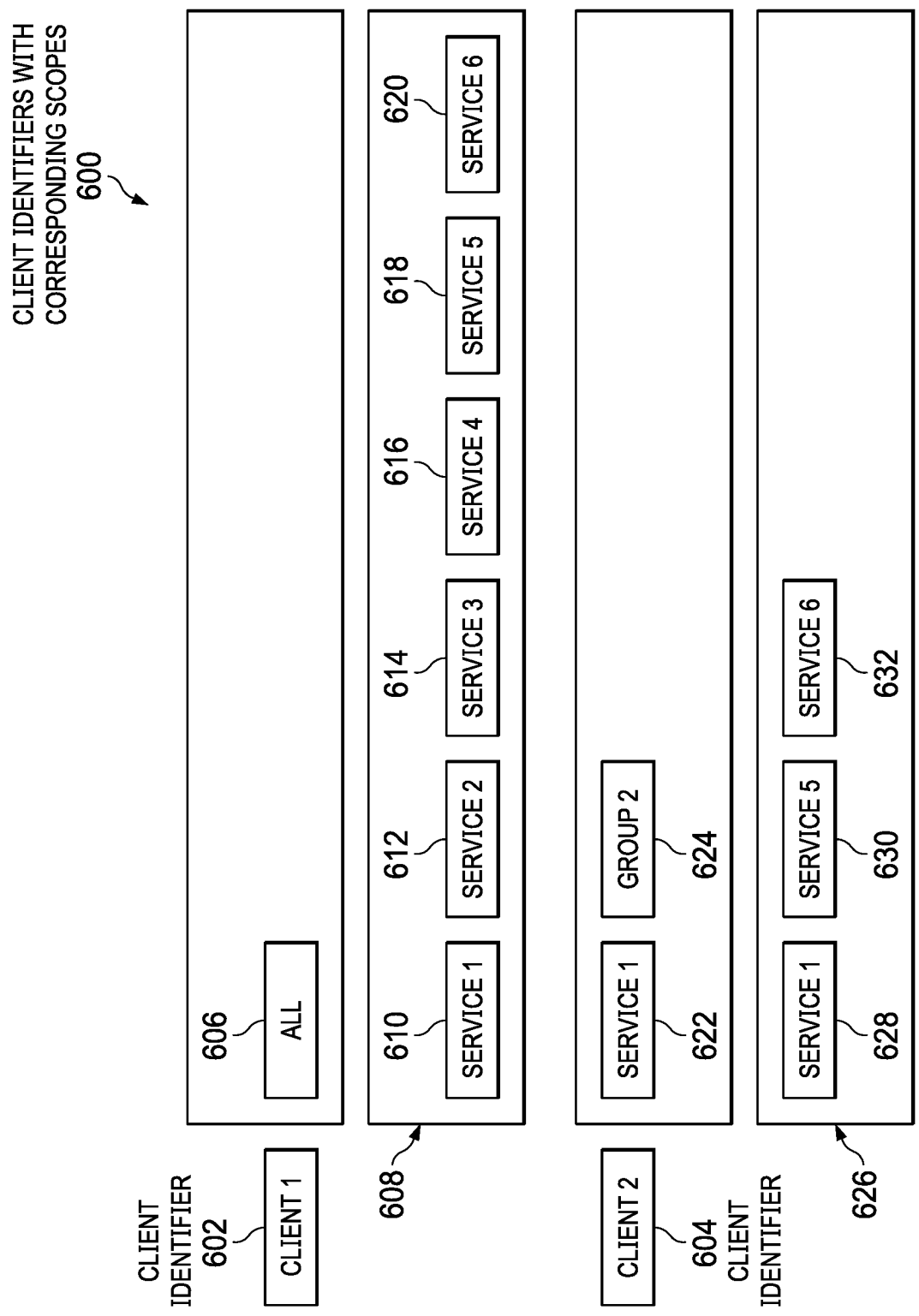
FIG. 6 is a diagram illustrating an example of client identifiers with corresponding scopes in accordance with an illustrative embodiment.

With reference now to FIG. 6, a diagram illustrating an example of client identifiers with corresponding scopes is depicted in accordance with an illustrative embodiment. In this example, client identifiers with corresponding scopes 600 include client identifier "CLIENT1" 602 and client identifier "CLIENT2" 604.

Client identifier "CLIENT1" 602 is associated with scope alias "ALL" 606, such as, for example, scope alias "ALL" 504 in FIG. 5. Scope alias "ALL" 606 represents corresponding scopes 608. Corresponding scopes 608 include "SERVICE1" 610, "SERVICE2" 612, "SERVICE3" 614, "SERVICE4" 616, "SERVICE5" 618, and "SERVICE6" 620, such as, for example, "SERVICE1" 510, "SERVICE2" 512, "SERVICE3" 514, "SERVICE4" 516, "SERVICE5" 518, and "SERVICE6" 520 in FIG. 5. Thus, when an authorization server, such as, for example, authorization server 106 in FIG. 1, expands scope alias "ALL" 606, which is specified in an access token request by a client or included in a scopes field of a received access token, the result of the expansion is "SERVICE1" 610, "SERVICE2" 612, "SERVICE3" 614, "SERVICE4" 616, "SERVICE5" 618, and "SERVICE6" 620.

Client identifier "CLIENT2" 604 is associated with scope "SERVICE1" 622 and scope alias "GROUP2" 624, such as, for example, scope alias "GROUP2" 506 in FIG. 5. Scope alias "GROUP2" 624 represents a portion of corresponding scopes 626. Corresponding scopes 626 include "SERVICE1" 628, "SERVICE5" 630, and "SERVICE6" 632. When the authorization server expands scope alias "GROUP2" 624, which is specified in an access token request by a client or included in a scopes field of a received access token, the result of the expansion is "SERVICE5" 630 and "SERVICE6" 632.

Figure 7:
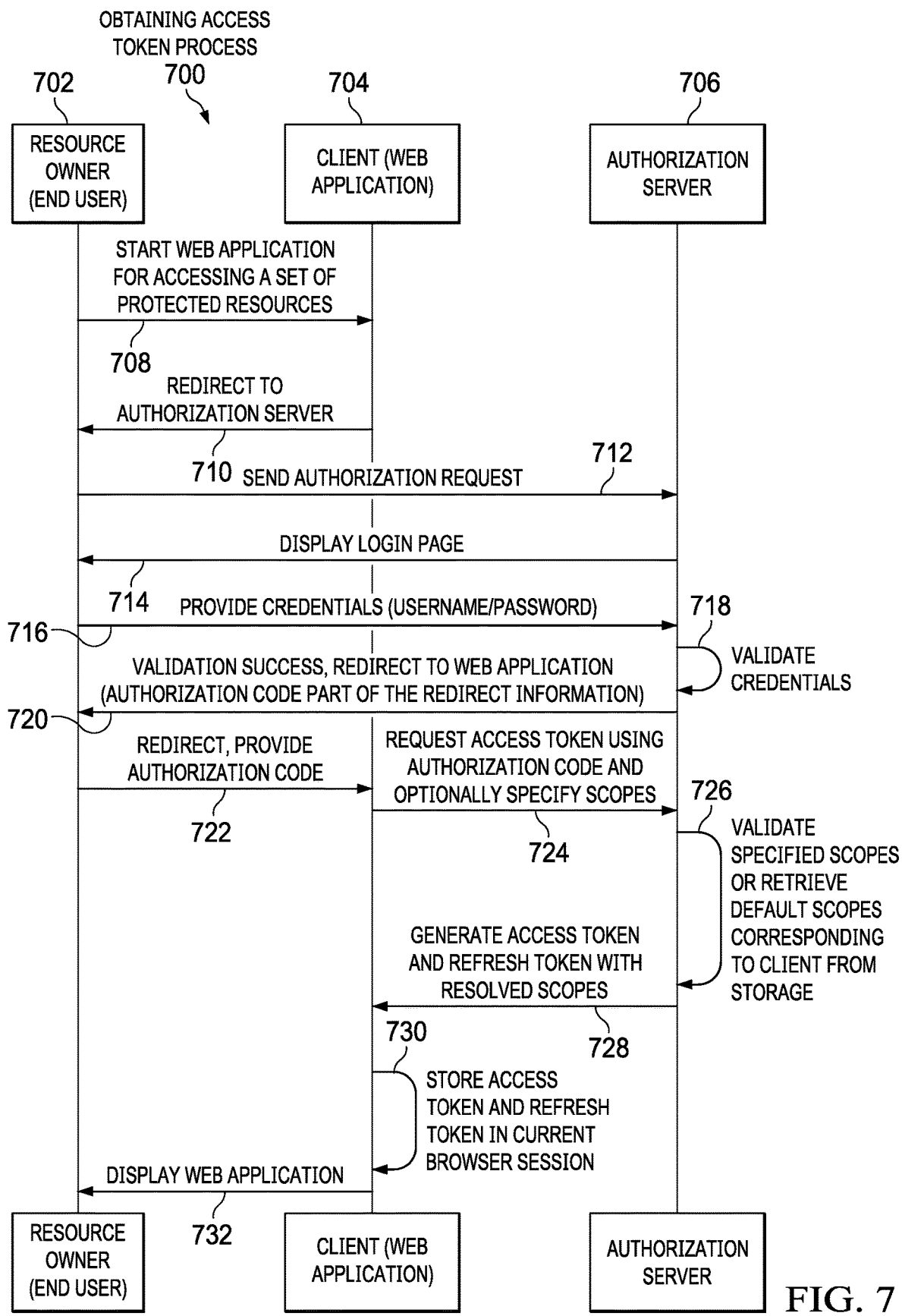
FIG. 7 is a diagram illustrating an example process for obtaining an access token in accordance with an illustrative embodiment.

With reference now to FIG. 7, a diagram illustrating an example process for obtaining an access token is depicted in accordance with an illustrative embodiment. Obtaining access token process 700 may be implemented in a network of data processing systems, such as, for example, network data processing system 100 in FIG. 1 or a cloud computing environment, such as, for example, cloud computing environment 300 in FIG. 3. In this example, obtaining access token process 700 includes resource owner 702, client 704, and authorization server 706. Client 704 may be, for example, client 112 in FIG. 1 or local computing device 320A in FIG. 3. Authorization server 706 may be, for example, authorization server 106 in FIG. 1, data processing system 200 in FIG. 2, or a cloud computing node in cloud computing nodes 310 in FIG. 3. However, it should be noted that obtaining access token process 700 may include any number of resource owners, clients, and authorization servers. In other words, obtaining access token process 700 is intended as an example only and not as a limitation on illustrative embodiments.

At 708, resource owner 702 (e.g., an end user) starts a web application on client 704 for accessing a set of protected resources. The set of protected resources may be, for example, a set of one or more cloud services. At 710, client 704 redirects to authorization server 706. At 712, resource owner 702 sends an authorization request to authorization server 706. At 714, authorization server 706 displays a login page to resource owner 702. At 716, resource owner 702 provides credentials (e.g., username and password) to authorization server 706 via the login page.

At 718, authorization server 706 validates the credentials provided by resource owner 702. At 720, upon successful validation of the credentials, authorization server 706 redirects to the web application of client 704 with an authorization code as part of the redirect information to resource owner 702. At 722, resource owner 702 provides the authorization code to client 704.

At 724, client 704 requests an access token from authorization server 706 using the authorization code and optionally specifies scopes in the access token request for accessing the set of protected resources. At 726, authorization server 706 validates the specified scopes in the access token request or, if no scopes were specified in the access token request, authorization server 706 retrieves authorized scopes corresponding to the client from storage.

A specific illustrative example for scope handling according to OAuth 2.0 when scope aliasing is supported is described here. The web application of client 704 (e.g., the web application corresponding to client identifier 602 in FIG. 6) has the following scope alias "ALL" (e.g., scope alias 606 in FIG. 6), which is equivalent to the specific individual scopes of SERVICE1, SERVICE2, SERVICE3, SERVICE4, SERVICE5, and SERVICE6 (e.g., scopes 610-620 in FIG. 6). Scenario 1, client 704 does not specify any scopes in the access token request. As a result, authorization server 706 retrieves all authorized scopes (i.e., SERVICE1, SERVICE2, SERVICE3, SERVICE4, SERVICE5, SERVICE6) corresponding to client 704 from storage.

Authorization server 706 then limits the number of scopes for the scopes field of the access token using the scope alias "ALL" to represent the individual scopes of SERVICE1, SERVICE2, SERVICE3, SERVICE4, SERVICE5, AND SERVICE6, while maintaining the same level of permissions for the access token. Scenario 2, client 704 does specify particular scopes, such as SERVICE1, SERVICE5, and SERVICE6 (e.g., scopes 628-632 in FIG. 6), in the access token request. Alternatively, client 704 uses a combination of individual scopes with one or more scope aliases (e.g., SERVICE1, GROUP2, such as scope 622 and scope alias 624 in FIG. 6) in the access token request. Authorization server 706 then returns all valid client scopes (e.g., SERVICE1, SERVICE5, SERVICE6) or alternatively, using a scope in combination with a scope alias (e.g., SERVICE1, GROUP2) for generating the access token.

At 728, authorization server 706 generates the access token and a refresh token for the client with resolved (i.e., authorized or valid) scopes and sends the access token to client 704. At 730, client 704 stores the access token and refresh token in the current browser session. At 732, client 704 displays the web application to resource owner 702 for accessing the set of protected resources.

Figure 8:
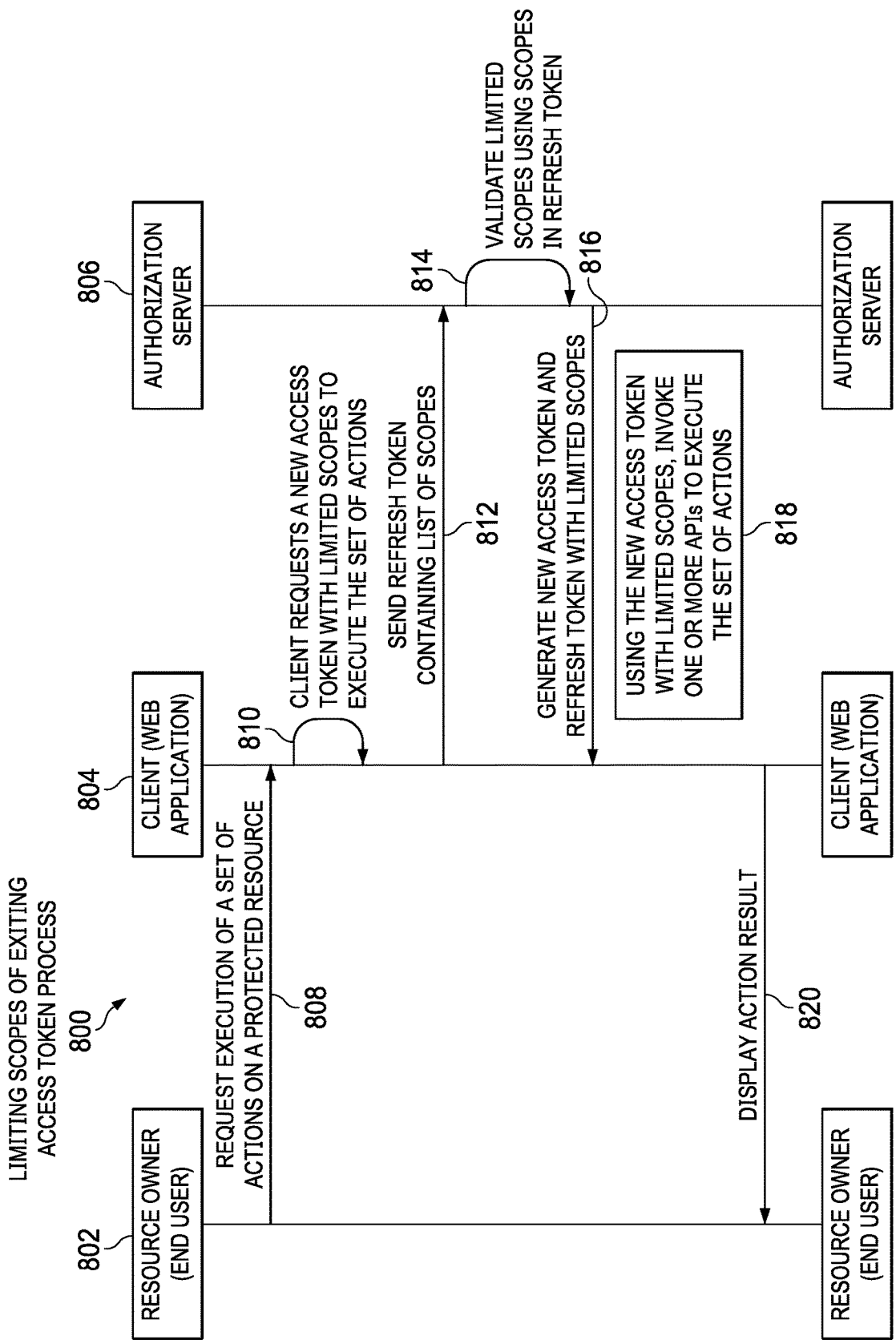
FIG. 8 is a diagram illustrating an example process for limiting scopes of an existing access token in accordance with an illustrative embodiment.

With reference now to FIG. 8, a diagram illustrating an example process for limiting scopes of an existing access token is depicted in accordance with an illustrative embodiment. Limiting scopes of existing access token process 800 may be implemented in a network of data processing systems, such as, for example, network data processing system 100 in FIG. 1 or a cloud computing environment, such as, for example, cloud computing environment 300 in FIG. 3. In this example, limiting scopes of existing access token process 800 includes resource owner 802, client 804, and authorization server 806. Client 804 may be, for example, client 112 in FIG. 1 or local computing device 320A in FIG. 3. Authorization server 806 may be, for example, authorization server 106 in FIG. 1, data processing system 200 in FIG. 2, or a cloud computing node in cloud computing nodes 310 in FIG. 3. However, it should be noted that limiting scopes of existing access token process 800 may include any number of resource owners, clients, and authorization servers. In other words, limiting scopes of existing access token process 800 is intended as an example only and not as a limitation on illustrative embodiments.

At 808, resource owner 802 (e.g., an end user) requests execution of a set of actions on a protected resource. The protected resource may be, for example, a service, such as a database service. The set of actions may be, for example, one or more of create, read, update, delete, and the like. At 810, client 804 (e.g., a web application on client 804) requests a new access token with a limited set of scopes that specifically permit execution of only those actions included in the set of actions. At 812, client 804 sends a refresh token containing a list of scopes of client 804. At 814, authorization server 806 validates the limited set of scopes specified for the new access token using the list of scopes contained in the refresh token.

A specific illustrative example for scope handling according to OAuth 2.0 when scope aliasing is supported is described here. The refresh token of client 804 contains a list of individual scopes of SERVICE1, SERVICE2, SERVICE3, SERVICE4, SERVICE5, and SERVICE6 (e.g., scopes 610-620 in FIG. 6) or the equivalent scope alias "ALL" (e.g., scope alias 606 in FIG. 6). Client 804 specifies a particular limited set of individual scopes, such as SERVICE1, SERVICE5, and SERVICE6 (e.g., scopes 628-632 in FIG. 6), in the request for the new access token. Alternatively, client 804 specifies the limited set of scopes using a combination of an individual scope with a scope alias (e.g., SERVICE1, GROUP2, such as scope 622 and scope alias 624 in FIG. 6) in the request for the new access token. Authorization server 806 then validates the limited set of scopes (e.g., SERVICE1, SERVICE5, SERVICE6 or SERVICE1, GROUP2) based on the list of scopes contained in the refresh token. It should be noted that if the limited set of scopes contains a scope alias (e.g., GROUP2), then authorization server 806 expands the scope alias to its corresponding individual scopes (e.g., SERVICE5, SERVICE6) before performing the scope validation process using the list of scopes contained in the refresh token. In response to validating the limited set of scopes specified in the request for the new access token, authorization server 806 returns SERVICE1, GROUP2 (i.e., SERVICE1, SERVICE5, SERVICE6) for generating the new access token and refresh token for client 804. Using the combination of scope and scope alias for the new access token decreases the size of the scopes field as opposed to using all of the individual scopes specified in the limited set of scopes.

At 816, authorization server 806 generates the new access token and a new refresh token with the limited set of scopes and sends the new access token and the new refresh token to client 804. At 818, client 804, using the new access token with the limited set of scopes, invokes one or more application programming interfaces to execute the set of actions. At 820, client 804 displays a result of the set of actions to resource owner 802 via the web application.

Figure 9:
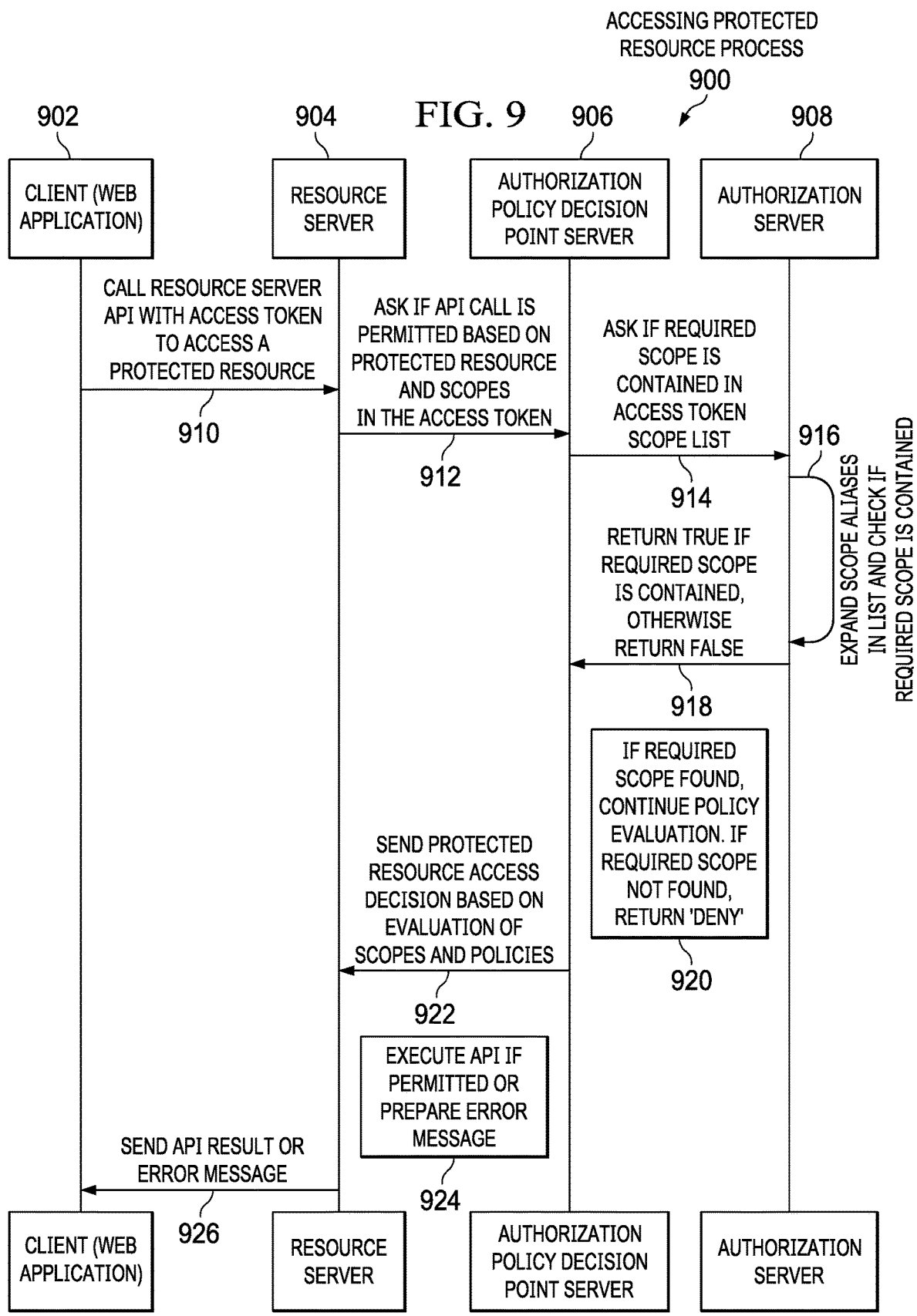
FIG. 9 is a diagram illustrating an example process for accessing a protected resource process in accordance with an illustrative embodiment.

With reference now to FIG. 9, a diagram illustrating an example process for accessing a protected resource is depicted in accordance with an illustrative embodiment. Accessing protected resource process 900 may be implemented in a network of data processing systems, such as, for example, network data processing system 100 in FIG. 1 or a cloud computing environment, such as, for example, cloud computing environment 300 in FIG. 3. In this example, accessing protected resource process 900 includes client 902, resource server 904, authorization policy decision point server 906, and authorization server 908. Client 902 may be, for example, client 112 in FIG. 1 or local computing device 320A in FIG. 3. Resource server 904 may be, for example, resource server 104 in FIG. 1 or a cloud computing node in cloud computing nodes 310 in FIG. 3, which hosts a set of one or more protected resources. For example, resource server 904 may be a database containing sensitive data of a resource owner. Authorization policy decision point server 906 may be, for example, authorization policy decision point server 108 in FIG. 1 or another cloud computing node in cloud computing nodes 310 in FIG. 3, which provides access authorization decisions based on authorization policies corresponding to resource server 904. Authorization server 908 may be, for example, authorization server 106 in FIG. 1, data processing system 200 in FIG. 2, or yet another cloud computing node in cloud computing nodes 310 in FIG. 3. However, it should be noted that in an alternative illustrative embodiment, authorization policy decision point server 906 and authorization server 908 may be located on the same server. Moreover, accessing protected resource process 900 may include any number of clients, resource servers, authorization policy decision point servers, and authorization servers. In other words, accessing protected resource process 900 is intended as an example only and not as a limitation on illustrative embodiments.

At 910, client 902 (e.g., a web application on client 902) calls an application programming interface on resource server 904 with an access token of client 902 requesting access to a protected resource hosted by resource server 904. At 912, resource server 904 checks with authorization policy decision point server 906 as to whether the application programming interface call is permitted based on the protected resource requested and scopes contained in the access token of client 902. At 914, authorization policy decision point server 906 asks authorization server 908 to determine whether a scope required to access the protected resource hosted by resource server 904 is contained in the access token of client 902.

At 916, authorization server 908 expands each scope alias contained in the access token of client 902 to individual scopes represented by each scope alias and checks whether the required scope is present. At 918, authorization server 908 returns "TRUE" when the required scope to access the protected resource is present. Otherwise, authorization server 908 returns "FALSE" when the required scope to access the protected resource is not present. At 920, when the required scope to access the protected resource is present, authorization policy decision point server 906, continues evaluation of authorization policies corresponding to resource server 904. Alternatively, when the required scope to access the protected resource is not present, authorization server 908 returns "DENY".

At 922, authorization policy decision point server 906 sends a protected resource access decision to resource server 904 based on the scope evaluation and authorization policy evaluation. At 924, resource server 904 executes the application programming interface call when the application programming interface call is permitted based on the resource access decision received from authorization policy decision point server 906. Alternatively, resource server 904 prepares an error message when the application programming interface call is not permitted based on the resource access decision received from authorization policy decision point server 906. At 926, resource server 904 sends either the result of executing the application programming interface call or the error message to client 902.

Figure 10:
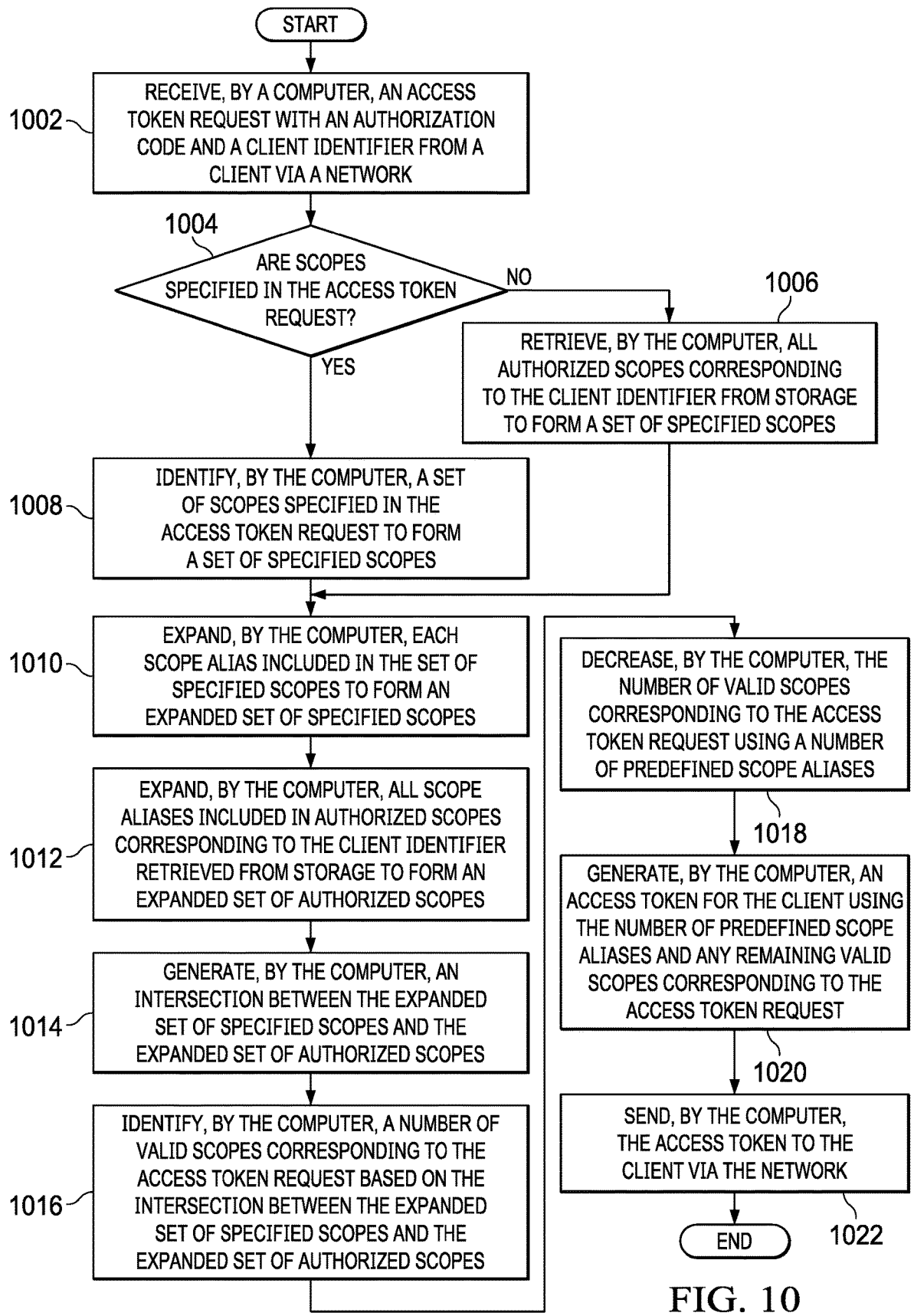
FIG. 10 is a flowchart illustrating a process for generating an access token in accordance with an illustrative embodiment.

With reference now to FIG. 10, a flowchart illustrating a process for generating an access token is shown in accordance with an illustrative embodiment. The process shown in FIG. 10 may be implemented in a computer, such as, for example, authorization server 106 in FIG. 1 or data processing system 200 in FIG. 2.

The process begins when the computer receives an access token request with an authorization code and a client identifier from a client via a network (step 1002). The client identifier uniquely identifies the client sending the access token request. The computer analyzes the access token request and makes a determination as to whether scopes are specified in the access token request based on the analysis (step 1004). A scope defines a permission to access a particular protected resource or a particular set of protected resources. A protected resource may be, for example, a cloud service, such as a database service, a storage service, a data processing service, an application service, a platform service, an infrastructure service, or the like.

If the computer determines that scopes are not specified in the access token request based on the analysis, no output of step 1004, then the computer retrieves all authorized scopes corresponding to the client identifier from storage to form a set of specified scopes (step 1006). Thereafter, the process proceeds to step 1010. If the computer determines that scopes are specified in the access token request based on the analysis, yes output of step 1004, then the computer identifies a set of scopes specified in the access token request to form a set of specified scopes (step 1008).

The computer expands each scope alias included in the set of specified scopes to form an expanded set of specified scopes (step 1010). In other words, the expanded set of specified scopes does not contain any scope aliases, but only individual scopes. In addition, the computer expands all scope aliases included in authorized scopes corresponding to the client identifier retrieved from storage to form an expanded set of authorized scopes (step 1012). Similarly, the expanded set of authorized scopes does not contain any scope aliases, but only individual scopes.

The computer generates an intersection between the expanded set of specified scopes and the expanded set of authorized scopes (step 1014). Further, the computer identifies a number of valid scopes corresponding to the access token request by the client based on the intersection between the expanded set of specified scopes and the expanded set of authorized scopes (step 1016). Furthermore, the computer decreases the number of valid scopes corresponding to the access token request using a number of predefined scope aliases (step 1018). Each of the number of predefined scope aliases represents a collection of two or more client-specified individual scopes. In other words, the computer knows which group of individual scopes to include in a particular scope alias.

Afterward, the computer generates an access token for the client using the number of predefined scope aliases and any remaining valid scopes corresponding to the access token request not included in at least one of the number of predefined scope aliases (step 1020). Then, the computer sends the access token to the client via the network (step 1022). Thereafter, the process terminates.

Figure 11:
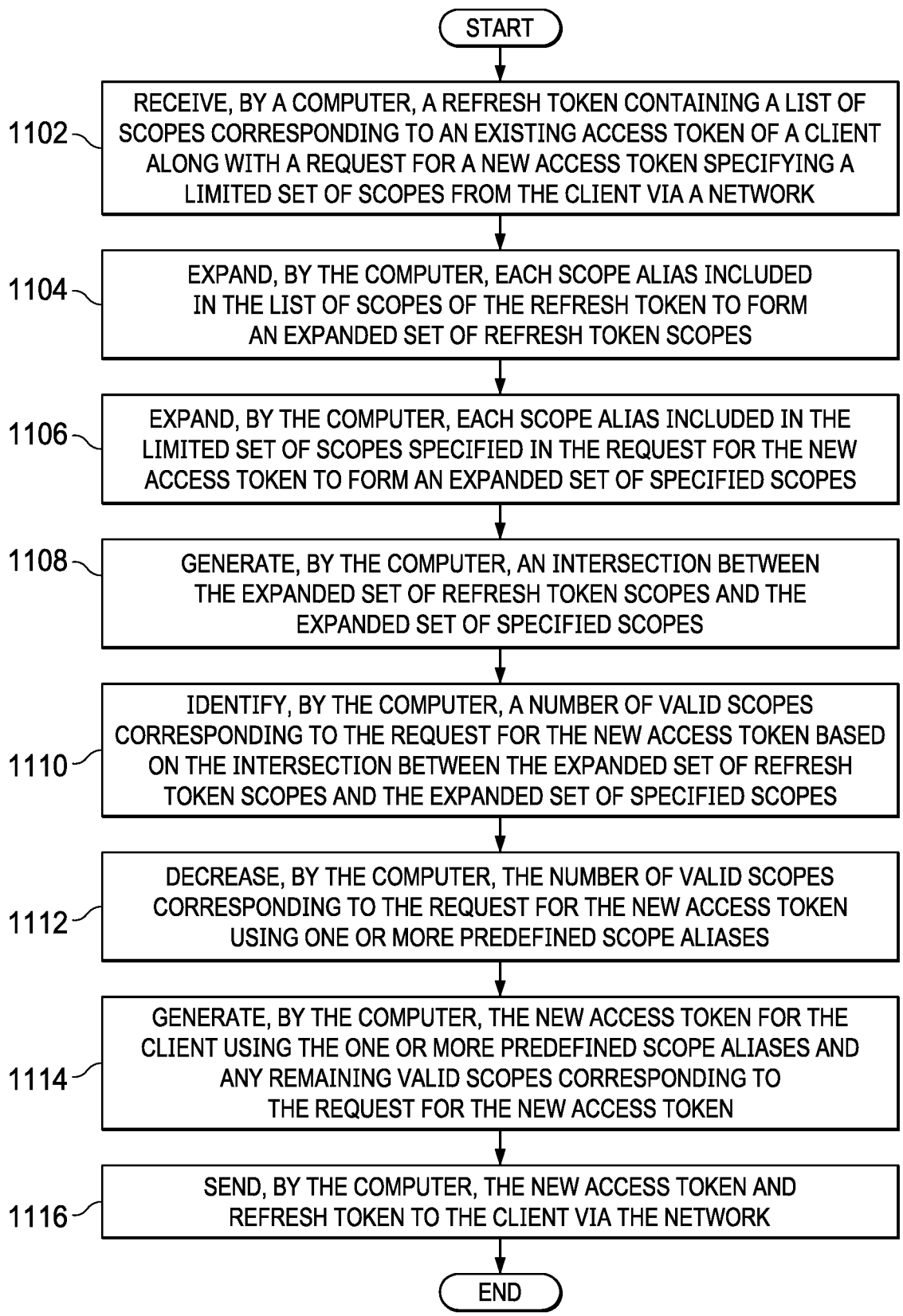
FIG. 11 is a flowchart illustrating a process for limiting a number of scopes of an existing access token in accordance with an illustrative embodiment.

With reference now to FIG. 11, a flowchart illustrating a process for limiting a number of scopes of an existing access token is shown in accordance with an illustrative embodiment. The process shown in FIG. 11 may be implemented in a computer, such as, for example, authorization server 106 in FIG. 1 or data processing system 200 in FIG. 2.

The process begins when the computer receives a refresh token containing a list of scopes corresponding to an existing access token of a client along with a request for a new access token specifying a limited set of scopes from the client via a network (step 1102). The limited set of scopes is specific to a particular set of protected resources that the client wants to access. The computer expands each scope alias included in the list of scopes of the refresh token to form an expanded set of refresh token scopes (step 1104). In other words, the expanded set of refresh token scopes does not include any scope aliases, but only individual scopes. In addition, the computer expands each scope alias included in the limited set of scopes specified in the request for the new access token to form an expanded set of specified scopes (step 1106). Similarly, the expanded set of specified scopes does not include any scope aliases, but only individual scopes.

The computer generates an intersection between the expanded set of refresh token scopes and the expanded set of specified scopes (step 1108). Further, the computer identifies a number of valid scopes corresponding to the request for the new access token based on the intersection between the expanded set of refresh token scopes and the expanded set of specified scopes (step 1110). Furthermore, the computer decreases the number of valid scopes corresponding to the request for the new access token using one or more predefined scope aliases (step 1112). Each of the one or more predefined scope aliases represents a collection of two or more client-specified individual scopes. In other words, the computer knows which group of individual scopes to include in a particular scope alias.

Subsequently, the computer generates the new access token for the client using the one or more predefined scope aliases and any remaining valid scopes corresponding to the request for the new access token that were not included in the one or more predefined scope aliases (step 1114). The computer then sends the new access token and refresh token to the client via the network (step 1116). Thereafter, the process terminates.

Figure 12:
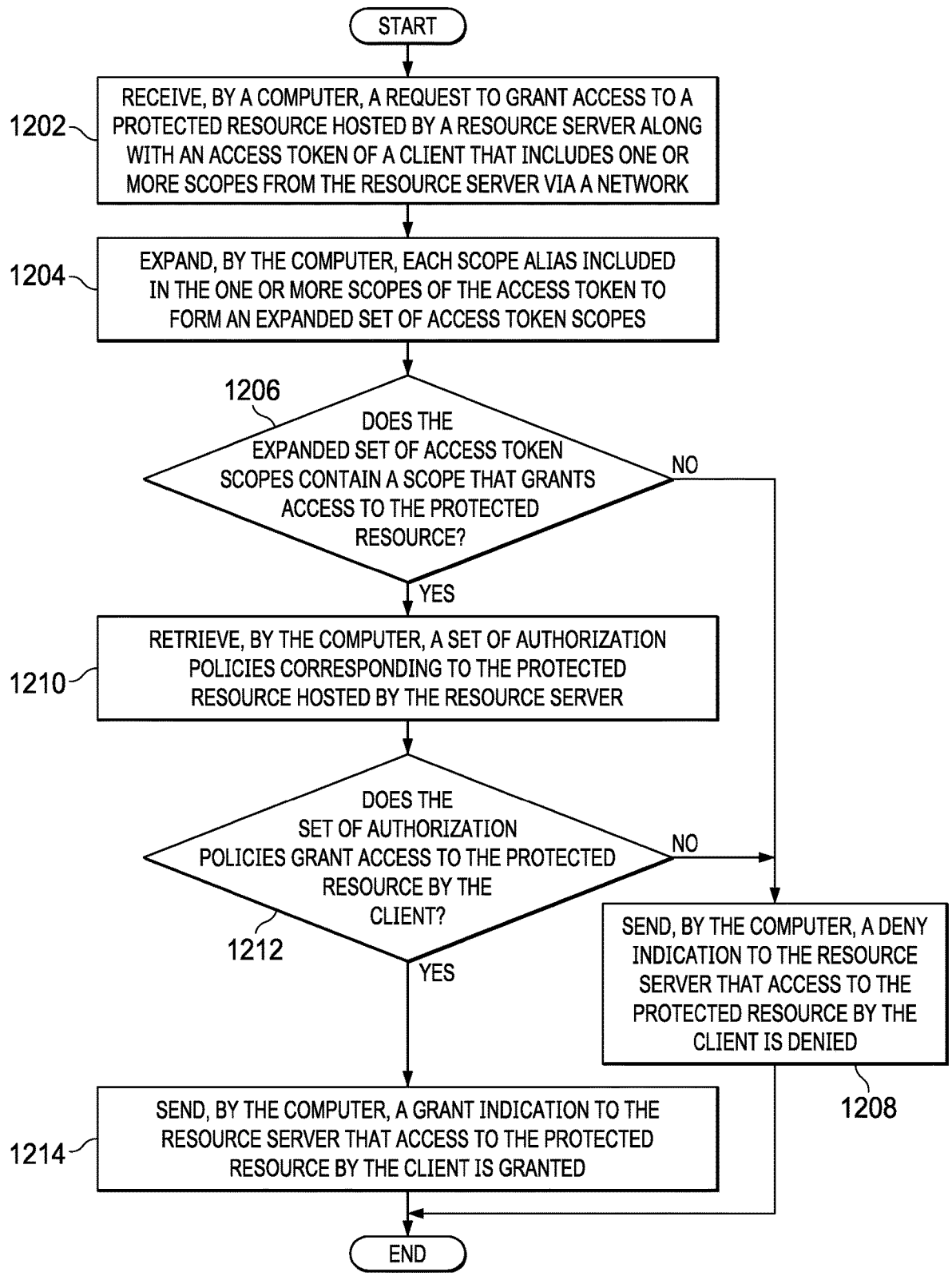
FIG. 12 is a flowchart illustrating a process for determining access to a protected resource by a client in accordance with an illustrative embodiment.

With reference now to FIG. 12, a flowchart illustrating a process for determining access to a protected resource by a client is shown in accordance with an illustrative embodiment. The process shown in FIG. 12 may be implemented in a computer, such as, for example, authorization server 106 data processing system 200 in FIG. 2.

The process begins when the computer receives a request to grant access to a protected resource hosted by a resource server along with an access token of a client that includes one or more scopes from the resource server via a network (step 1202). The computer expands each scope alias included in the one or more scopes of the access token to form an expanded set of access token scopes (step 1204). In other words, the expanded set of access token scopes does not contain any scope aliases, but only individual scopes.

The computer analyzes the expanded set of access token scopes and makes a determination as to whether the expanded set of access token scopes contains a scope that grants access to the protected resource (step 1206). If the computer determines that the expanded set of access token scopes does not contain a scope that grants access to the protected resource, no output of step 1206, then the computer sends an indication to the resource server that access to the protected resource by the client is denied (step 1208). Thereafter, the process terminates. If the computer determines that the expanded set of access token scopes does contain a scope that grants access to the protected resource, yes output of step 1206, then the computer retrieves a set of authorization policies corresponding to the protected resource hosted by the resource server (step 1210).

Afterward, the computer makes a determination as to whether the set of authorization policies grants access to the protected resource by the client (step 1212). If the computer determines that the set of authorization policies does not grant access to the protected resource by the client, no output of step 1212, then the process returns to step 1208 where the computer sends an indication to the resource server that access to the protected resource by the client is denied. If the computer determines that the set of authorization policies does grant access to the protected resource by the client, yes output of step 1212, then the computer sends an indication to the resource server that access to the protected resource by the client is granted (step 1214). Thereafter, the process terminates.

Figure 13:
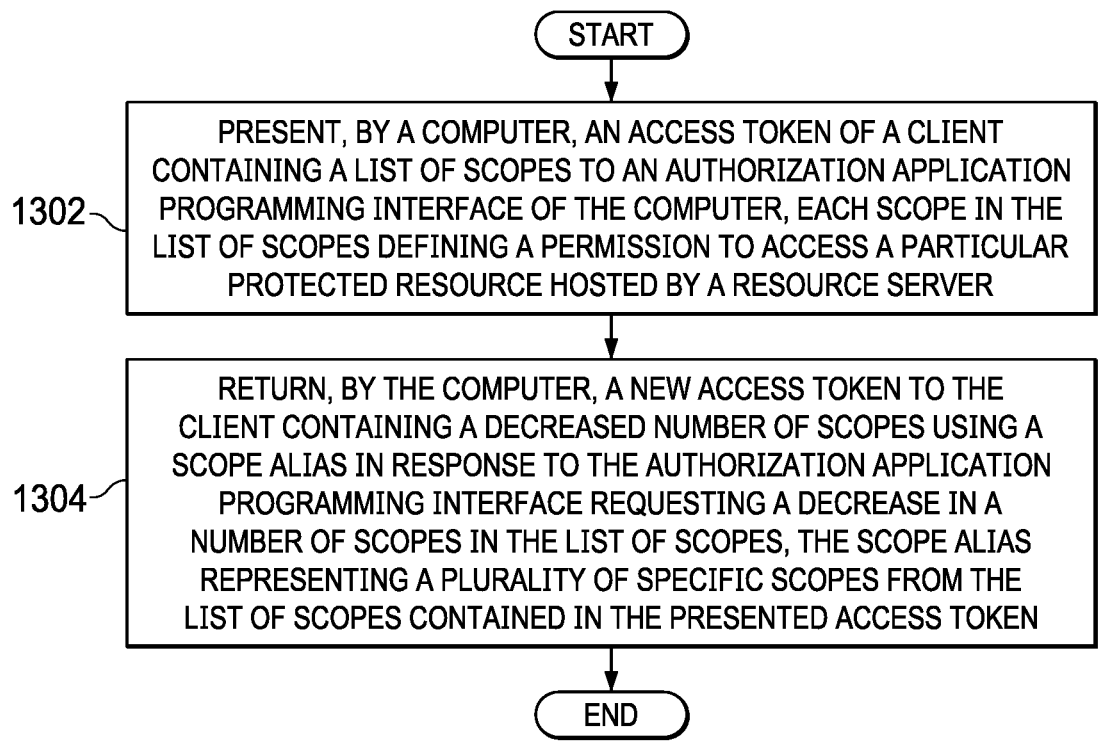
FIG. 13 is a flowchart illustrating a process for managing a size of an access token in accordance with an illustrative embodiment.

With reference now to FIG. 13, a flowchart illustrating a process for managing a size of an access token is shown in accordance with an illustrative embodiment. The process shown in FIG. 13 may be implemented in a computer, such as, for example, authorization server 106 in FIG. 1 or data processing system 200 in FIG. 2.

The process begins when the computer presents an access token of a client containing a list of scopes to an authorization application programming interface of the computer (step 1302). Each scope in the list of scopes defines a permission to access a particular protected resource hosted by a resource server. The computer returns a new access token to the client containing a decreased number of scopes using a scope alias in response to the authorization application programming interface requesting a decrease in a number of scopes in the list of scopes (step 1304). The scope alias represents a plurality of specific scopes from the list of scopes contained in the presented access token. The authorization application programming interface knows which individual scopes to include in the scope alias for a particular set of protected resources that the client is requesting access. By the computer decreasing the number of scopes using the scope alias, the computer reduces the size of a scopes field of the access token generated by the computer, which decreases the size of the access token. Decreasing the size of the access token increases network response time causing decreased time to access the protected resources and increased system performance. Thereafter, the process terminates.

Thus, illustrative embodiments of the present invention provide a computer-implemented method, computer system, and computer program product for limiting a number of scopes in access token-based authorization systems while maintaining a same level of access permissions for access tokens. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for access token scope limiting, the computer-implemented method comprising:
    presenting, by a computer, an access token received from a client containing a list of scopes to an authorization application programming interface of the computer, each scope contained in the list of scopes defining a permission to access a particular protected resource hosted by a resource server; and
    returning, by the computer, a new access token to the client containing a decreased number of scopes using a scope alias in response to the authorization application programming interface requesting the decrease in the number of scopes in the list of scopes, the scope alias representing a plurality of specific scopes from the list of scopes contained in the presented access token, wherein the scope alias maintains a same level of access permissions for the access token as the list of scopes that the scope alias represents.

2. The computer-implemented method of claim 1, further comprising:
    receiving, by the computer, an access token request with an authorization code and a client identifier from the client via a network;
    determining, by the computer, whether scopes are specified in the access token request based on an analysis of the access token request; and
    responsive to the computer determining that scopes are specified in the access token request based on the analysis, identifying, by the computer, a set of scopes specified in the access token request to form a set of specified scopes.

3. The computer-implemented method of claim 2 further comprising:
    expanding, by the computer, each scope alias included in the set of specified scopes to form an expanded set of specified scopes; and
    expanding, by the computer, all scope aliases included in authorized scopes (i) corresponding to the client identifier and (ii) retrieved from storage to form an expanded set of authorized scopes.

4. The computer-implemented method of claim 3 further comprising:
    generating, by the computer, an intersection between the expanded set of specified scopes and the expanded set of authorized scopes; and
    identifying, by the computer, a number of valid scopes corresponding to the access token request by the client based on the intersection between the expanded set of specified scopes and the expanded set of authorized scopes.

5. The computer-implemented method of claim 4 further comprising:
    decreasing, by the computer, the number of valid scopes corresponding to the access token request using a number of predefined scope aliases, each of the number of predefined scope aliases representing a collection of two or more client-specified individual scopes;
    generating, by the computer, the new access token for the client using the number of predefined scope aliases and any remaining valid scopes corresponding to the access token request not included in at least one of the number of predefined scope aliases; and
    sending, by the computer, the new access token to the client via the network.

6. The computer-implemented method of claim 5 further comprising:
    receiving, by the computer, a request to grant access to a protected resource hosted by a resource server along with the access token of the client that includes one or more scopes from the resource server via the network;
    expanding, by the computer, each scope alias included in the one or more scopes of the access token to form an expanded set of access token scopes; and
    determining, by the computer, whether the expanded set of access token scopes contains a scope that grants access to the protected resource.

7. The computer-implemented method of claim 6 further comprising:

responsive to the computer determining that the expanded set of access token scopes does not contain a scope that grants access to the protected resource, sending, by the computer, an indication to the resource server that access to the protected resource by the client is denied.

8. The computer-implemented method of claim 6 further comprising:
responsive to the computer determining that the expanded set of access token scopes does contain a scope that grants access to the protected resource, retrieving, by the computer, a set of authorization policies corresponding to the protected resource hosted by the resource server; and
determining, by the computer, whether the set of authorization policies grants access to the protected resource by the client.

9. The computer-implemented method of claim 8 further comprising:
responsive to the computer determining that the set of authorization policies does not grant access to the protected resource by the client, sending, by the computer, a deny indication to the resource server that access to the protected resource by the client is denied; and
responsive to the computer determining that the set of authorization policies does grant access to the protected resource by the client, sending, by the computer, a grant indication to the resource server that access to the protected resource by the client is granted.

10. The computer-implemented method of claim 1 further comprising:
receiving, by the computer, a refresh token containing a list of scopes corresponding to an existing access token of the client along with a request for the new access token specifying a limited set of scopes from the client via a network, the limited set of scopes specific to a particular set of protected resources that the client wants to access;
expanding, by the computer, each scope alias included in the list of scopes of the refresh token to form an expanded set of refresh token scopes; and
expanding, by the computer, each scope alias included in the limited set of scopes specified in the request for the new access token to form an expanded set of specified scopes.

11. The computer-implemented method of claim 10 further comprising:
generating, by the computer, an intersection between the expanded set of refresh token scopes and the expanded set of specified scopes; and
identifying, by the computer, a number of valid scopes corresponding to the request for the new access token based on the intersection between the expanded set of refresh token scopes and the expanded set of specified scopes.

12. The computer-implemented method of claim 11 further comprising:
decreasing, by the computer, the number of valid scopes corresponding to the request for the new access token using one or more predefined scope aliases, each of the one or more predefined scope aliases representing a collection of two or more client-specified individual scopes;
generating, by the computer, the new access token for the client using the one or more predefined scope aliases and any remaining valid scopes corresponding to the request for the new access token that were not included in the one or more predefined scope aliases; and
sending, by the computer, the new access token to the client via the network.

13. A computer system for access token scope limiting, the computer system comprising:
a bus system;
a storage device connected to the bus system, wherein the storage device stores program instructions; and
a processor connected to the bus system, wherein the processor executes the program instructions to:
present an access token received from a client containing a list of scopes to an authorization application programming interface, each scope contained in the list of scopes defining a permission to access a particular protected resource hosted by a resource server; and
return a new access token to the client containing a decreased number of scopes using a scope alias in response to the authorization application programming interface requesting the decrease in the number of scopes in the list of scopes, the scope alias representing a plurality of specific scopes from the list of scopes contained in the presented access token, wherein the scope alias maintains a same level of access permissions for the access token as the list of scopes that the scope alias represents.

14. The computer system of claim 13, wherein the processor further executes the program instructions to:
receive an access token request with an authorization code and a client identifier from the client via a network;
determine whether scopes are specified in the access token request based on an analysis of the access token request; and
identify a set of scopes specified in the access token request to form a set of specified scopes in response to determining that scopes are specified in the access token request based on the analysis.

15. The computer system of claim 14, wherein the processor further executes the program instructions to:
expand each scope alias included in the set of specified scopes to form an expanded set of specified scopes; and
expand all scope aliases included in authorized scopes (i) corresponding to the client identifier and (ii) retrieved from storage to form an expanded set of authorized scopes.

16. The computer system of claim 15, wherein the processor further executes the program instructions to:
generate an intersection between the expanded set of specified scopes and the expanded set of authorized scopes;
identify a number of valid scopes corresponding to the access token request by the client based on the intersection between the expanded set of specified scopes and the expanded set of authorized scopes;
decrease the number of valid scopes corresponding to the access token request using a number of predefined scope aliases, each of the number of predefined scope aliases representing a collection of two or more client-specified individual scopes;
generate the new access token for the client using the number of predefined scope aliases and any remaining valid scopes corresponding to the access token request not included in at least one of the number of predefined scope aliases; and
send the new access token to the client via the network.

17. A computer program product for access token scope limiting, the computer program product comprising a computer readable storage medium having program instructions embodied therewith, the program instructions executable by a computer to cause the computer to perform a method of:

presenting, by the computer, an access token received from a client containing a list of scopes to an authorization application programming interface of the computer, each scope contained in the list of scopes defining a permission to access a particular protected resource hosted by a resource server; and returning, by the computer, a new access token to the client containing a decreased number of scopes using a scope alias in response to the authorization application programming interface requesting the decrease in the number of scopes in the list of scopes, the scope alias representing a plurality of specific scopes from the list of scopes contained in the presented access token, wherein the scope alias maintains a same level of access permissions for the access token as the list of scopes that the scope alias represents.

18. The computer program product of claim 17, further comprising:

receiving, by the computer, an access token request with an authorization code and a client identifier from the client via a network;

determining, by the computer, whether scopes are specified in the access token request based on an analysis of the access token request; and responsive to the computer determining that scopes are specified in the access token request based on the analysis, identifying, by the computer, a set of scopes specified in the access token request to form a set of specified scopes.

19. The computer program product of claim 18 further comprising:

expanding, by the computer, each scope alias included in the set of specified scopes to form an expanded set of specified scopes; and expanding, by the computer, all scope aliases included in authorized scopes (i) corresponding to the client identifier and (ii) retrieved from storage to form an expanded set of authorized scopes.

20. The computer program product of claim 19 further comprising:

generating, by the computer, an intersection between the expanded set of specified scopes and the expanded set of authorized scopes; and identifying, by the computer, a number of valid scopes corresponding to the access token request by the client based on the intersection between the expanded set of specified scopes and the expanded set of authorized scopes.

21. The computer program product of claim 20 further comprising:

decreasing, by the computer, the number of valid scopes corresponding to the access token request using a number of predefined scope aliases, each of the number of predefined scope aliases representing a collection of two or more client-specified individual scopes;

generating, by the computer, the new access token for the client using the number of predefined scope aliases and any remaining valid scopes corresponding to the access token request not included in at least one of the number of predefined scope aliases; and sending, by the computer, the new access token to the client via the network.

22. The computer program product of claim 21 further comprising:

receiving, by the computer, a request to grant access to a protected resource hosted by a resource server along with the access token of the client that includes one or more scopes from the resource server via the network;

expanding, by the computer, each scope alias included in the one or more scopes of the access token to form an expanded set of access token scopes; and determining, by the computer, whether the expanded set of access token scopes contains a scope that grants access to the protected resource.

23. The computer program product of claim 22 further comprising:

responsive to the computer determining that the expanded set of access token scopes does not contain a scope that grants access to the protected resource, sending, by the computer, an indication to the resource server that access to the protected resource by the client is denied.

24. The computer program product of claim 23 further comprising:

responsive to the computer determining that the expanded set of access token scopes does contain a scope that grants access to the protected resource, retrieving, by the computer, a set of authorization policies corresponding to the protected resource hosted by the resource server; and determining, by the computer, whether the set of authorization policies grants access to the protected resource by the client.

25. The computer program product of claim 24 further comprising:

responsive to the computer determining that the set of authorization policies does not grant access to the protected resource by the client, sending, by the computer, a deny indication to the resource server that access to the protected resource by the client is denied; and responsive to the computer determining that the set of authorization policies does grant access to the protected resource by the client, sending, by the computer, a grant indication to the resource server that access to the protected resource by the client is granted.

* * * * *